Patented Sept. 19, 1944

2,358,511

UNITED STATES PATENT OFFICE 2,358,511

ROTOGRAVURE INK

Matthew S. Hopkins, Detroit, Mich., assignor to Howard Flint Ink Company, Detroit, Mich., a corporation of Michigan No Drawing. Application May 25, 1940, Serial No. 337,203

12 Claims. (Cl. 106—24)

This invention relates to a non-inflammable ink and in particular to a non-inflammable ink suitable for intaglio or rotogravure printing.

Printing inks having water as one of their chief constituents have heretofore been proposed in the art. However, these earlier inks were not successful as rotogravure inks for several reasons. Among these reasons may be mentioned that the application of these water inks to the paper caused the paper to curl, weakened the paper so that breakage was frequent during the operation of the press and these water inks dried on the etched cylinder of the printing press when the press was stopped to change rolls. The ink thus dried, stuck or bound the paper to the etched printing roll whereupon when the press was again started the paper web was broken.

Another defect of these prior water inks was that their chemical and physical characteristics would change while the ink was stored preparatory to using and also while the ink was on the press.

It is the object of this invention to produce an ink having a substantial water content which is entirely free from the above mentioned defects and possesses many valuable features such as quick initial setting, non-bleeding, non-cropping, freedom from tack (stickiness), but with strong adhesion to paper, clean and sharp printing, clean wiping, minimum tendency to stick the paper to the etched plate (metal roll) or other parts of the press, and which can be quickly cleaned or removed from the press after use.

Another valuable feature of this ink is that it is non-toxic and will not weaken or soften the paper which otherwise would result in tearing, splitting, curling or wrinkling of the paper.

The ink which is the subject matter of this invention will also maintain substantially uniform physical and chemical properties while stored and while on the press. The quick drying non-inflammable inks heretofore used, especially those containing water and sensitive reacting agents, such as fixed alkali, aldehyde, metal salts and the like, would not maintain uniform physical and chemical properties during storage or while on the press. It is this reactive tendency of these prior inks which has made storing without rapid change and continuously uniform results upon printing next to impossible and therefore such inks have had but limited application. These former more reactive inks generally have had an injurious effect on the press, containers and paper; and a serious toxic effect on the printing press operator. It should be noted that all fixed soluble salts and alkali, alkali earths and practically all reactive metallic compounds (electrolytes of all classes) tend to hydrolyze and in other ways affect changes and cause instability on keeping of the reactive inks. By elimination of such reactive agents I have obtained novel advantageous results.

As a binding agent for my ink I use a condensation product obtained by fully reacting a protein with an aldehyde. The reaction is carried on to completion and all excess of reactive agents removed or otherwise nullified before the ink is finished. The protein which I prefer is casein and the aldehyde which I prefer is formaldehyde. After the condensation reaction between the casein and formaldehyde is fully completed I obtain a resinous product which is as different from casein or formaldehyde as ester gum is different from the rosin and glycerine used in its manufacture. This new condensation product binder is, when dried on paper sufficiently, insoluble and a better binder than the film forming combinations formerly used in the older types or more reactive inks.

Pigments can be incorporated in this binder and the mixture used as an ink with satisfactory results. However, the combination is improved by an admixture of another binder made from rosin or similar product, triethanolamine, alcohol, water or glycerine, or other solvent. This second binder improves the dispersion of the pigment, the flow of the ink, the rate of initial set, the penetration, and also its stability, and assists in the easy clean up or wash up at the end of the working period.

Anti-freeze properties necessary to the transportation of the ink in cold weather are imparted by glycerine and alcohols in general and other miscible liquids such as diethylene glycol, which in addition to lowering the freezing point of the ink, the alcohols tend to increase the flow of the ink and what is most important, they actually prevent softening of the paper by the water present in the ink. Alcohol prevents the swelling or softening of the wood pulp and other cellular fibers by the water of the ink.

Another ingredient I prefer to use which controls penetration is an oily substance such as turpentine, kerosene oil, carbon tetrachloride, and mineral, vegetable or animal drying oils or non-drying oils. These oily substances tend to keep the ink close to the side of the paper to which it is applied and by slowing down the penetration of the ink decrease the weakening of the paper, web or sheet, by water. These oily substances also prevent the sticking of inked paper to the etched plate or roll of the printing press.

Preparation of the ink will now be described:

Solution No. 1

41 parts by weight of casein are slurried in 225 parts by weight of water between 70 and 100° F. (best 80° F.). Then when dispersion of casein in water is good and agitator going, add 10 parts by weight of aqua ammonia. Continue to agitate until a complete, nearly transparent, and absolutely smooth solution is had, free from all nibs, etc. This should not take more than twenty minutes, however, I like to continue for at least one and one-half hours. Then, as a temporary preservative, add 3 parts by weight of phenol (when the solution remains alkaline). It is advisable to shake the phenol up with a little water and agitate briskly to prevent local coagulation of the protein (casein) due to high concentration of phenol.

This solution will not keep indefinitely and, therefore, must be used within a few days time by turning it into the finished product.

Solution No. 2

I now add to the above No. 1 solution of 279 pounds:

14 parts by weight of water mixed with 19 parts by weight of formaldehyde (U. S. P. 40% solution). The aldehyde will turn the mass into a stiff curd which is insoluble and will partly separate. However, I continue to agitate when the solution becomes decidedly acid, then after prolonged agitation a peculiar change takes place. The mass gets more uniform, then thinner and thinner until a consistency not much more viscous than free water is had, while the reaction is decidedly acid. When the reaction is complete and the maximum fluidity is reached, I bring the pH of our solution, if so desired, to 8 or above with ammonia (approximately 3 parts). This end pH, it will be understood, can be varied at will, or left as it was, from strongly acid to the pH desired. When the mass remains clear but becomes viscous to give a splendid flowing vehicle which is miscible with alcohol and glycerine, making a nice vehicle which binds pigment to fabric so that the printing stands considerable washing and rubbing without bleeding or cropping.

Solution No. 3

Though Solution No. 2 keeps better than Solution No. 1, it does change somewhat but is further stabilized by the addition of the following:

69 parts by weight of rosin are melted and with temperature below 260° F., 21 parts by weight of triethanolamine are added, stir until thoroughly incorporated, cool to less than 180° F. and add 54 parts by weight of alcohol, stir until uniform and add to 315 parts of No. 1 and No. 2 solutions combined to form Solution No. 4.

Solution No. 4

I agitate thoroughly 459 parts by weight of Solution No. 3 and add the following:

64 parts by weight of glycerine, 16 parts by weight of aqua ammonia, 75 parts by weight of spirits of turpentine, 152 parts by weight of oxide of iron, 9 parts by weight of carbon black, 75 parts by weight of alcohol, 150 parts by weight of water.

It is very necessary to mix alcohol and water together, then incorporate black with the alcohol and water before adding to the rest. Otherwise, it will be very difficult to get pigments properly dispersed without extra and unnecessary milling.

Another brown rotogravure ink can be made by the same method using the following formula:

Solution A

| | Parts by weight |
|---|---|
| Phenol | 2 |
| Casein | 35 |
| Water | 195 |
| Ammonia | 9 |
| | 241 |

Solution B

| | Parts by weight |
|---|---|
| Solution A | 241 |
| Water | 12 |
| Formaldehyde | 16 |
| Ammonia | 3 |
| | 272 |

Solution C

| | Parts by weight |
|---|---|
| Solution B | 272 |
| Rosin | 59 |
| Triethanolamine | 18 |
| Alcohol | 47 |
| | 396 |

Solution D

| | Parts by weight |
|---|---|
| Solution C | 396 |
| Glycerine | 58 |
| Ammonia | 14 |
| Butyl alcohol | 32 |
| Kerosene | 36 |
| Para pulp 29% (paranitroaniline red) | 254 |
| Alcohol | 64 |
| Water | 127 |
| Carbon black | 19 |
| | 1000 |

The glycerine, while acting as a solvent and freeing-out agent, also tends to slow down the action of the water on the size and fiber of the paper and also acts as a temporary plasticizer. The ammonia tends to increase the fluidity of the ink and passes off in the drying without any bad effects on the adhesive properties of the ink. The alcohol increases fluidity, speed of volatilization, and prevents or retards the softening effect on the size and fiber of the paper. The kerosene in one case and the spirits of turpentine in the other, tend to collect on the surface of the ink, opposite to the paper, preventing the inked paper from sticking to the copper roll. In both cases, the function of the color is obvious. The aqua solution of alcohol, when mixed with the black, not only acts as a dispersing agent for the black, but further assists in increasing the flow and modifying the effect on the size and fiber of the paper.

Of course, these proportions are subject to many modifications. The kind of alcohol may vary. The glycerine may be substituted with somewhat different effect by glycol, as well as glycerine derivatives and other polyhydroxy alcohols and equivalents. The kerosene or spirits of turpentine may be substituted by other oleaginous substances, such as xylol, paraffins, oils and waxes.

Although casein is the protein which I prefer to condense or otherwise fully react with formaldehyde, other proteins may be used. The most typical proteins which lend themselves to this process and which may be substituted for casein are the glutelins which are alkali soluble proteins of plant origin and the phospho-proteins, a typical example of which is casein. Instead of formaldehyde other aldehydes can be used, such as furfuraldehyde, acetaldehyde or methylaldehyde. Instead of rosin some other resins can be used such as manila gum, damar gum and alcohol soluble synthetic gums including the synthetic copals. Instead of triethanolamine other ethanolamines can be substituted, such as diethanolamine and monoethanolamine, amyl amine, butyl amine and also some other more or less volatile bases, within the reasonable range of equivalents.

I claim:

1. An ink comprising essentially an aqueous solution of a product resulting from the final reaction of about one part by weight of an aldehyde on about two parts by weight of a protein in the absence of a fixed alkali salt, and a coloring substance.

2. An ink comprising essentially an aqueous solution of a product free from fixed electrolytes and resulting from the final reaction of about one part by weight of formaldehyde on about two parts by weight of casein, and a coloring substance.

3. An ink comprising essentially an aqueous solution of a product resulting from the final reaction of an aldehyde on a protein in the absence of a fixed alkali electrolyte and the reaction product of a resin dissolved in an ethanolamine, and a coloring substance.

4. An ink comprising essentially an aqueous solution of a product resulting from the final reaction of an aldehyde on a protein in the absence of a metal salt and the reaction product of a rosin dissolved in triethanolamine, and a coloring substance.

5. An ink made by dispersing color in a vehicle resulting from the final reaction of 41 parts of casein, 19 parts of formaldehyde and 10 parts of ammonia in 239 parts of water.

6. An ink comprising a color dispersed in a vehicle containing the final reaction of about 41 parts of casein with about 19 parts of formaldehyde, and about 10 parts of ammonia in an aqueous medium, and said vehicle also containing a reaction product of about 69 parts of resin with about 21 parts of triethanolamine, and in addition said vehicle also containing about 29 parts of alcohol and about 64 parts of glycerine.

7. A method of preparing an ink vehicle comprising the steps of reacting an aqueous alkaline solution of a protein with an aldehyde to form a condensation product, said solution being free from fixed alkali, agitating the condensation product until it becomes a homogeneous, thin, free-flowing acid solution having a consistency about as viscous as water.

8. A method of preparing an ink vehicle comprising the steps of reacting at room temperature in the absence of borax and sodium fluoride an aqueous alkaline solution in the proportion of about two parts by weight of casein to about one part by weight of formaldehyde, agitating the product until the reaction has gone through to completion, is a homogeneous, thin, free-flowing solution.

9. A method of preparing an ink vehicle comprising the steps of reacting an aqueous alkaline solution of a protein with an aldehyde, agitating the product until the reaction has gone through to completion, is a homogeneous, thin, free-flowing liquid having a consistency about as viscous as water, and then adding the reaction product of a resin with a volatile alkaline solvent.

10. A method of preparing an ink vehicle comprising the steps of reacting at room temperature an aqueous alkaline solution of casein with formaldehyde, agitating the product until the reaction has gone through to completion, is a homogeneous, thin, free-flowing liquid having a consistency about as viscous as water, correcting pH of liquid with volatile solvent, then adding product of reaction between rosin and triethanolamine at a temperature less than 280° F.

11. A method of preparing an ink comprising the steps of reacting an aqueous ammoniacal solution of casein with formaldehyde, agitating the product until the reaction between the casein and the formaldehyde has gone through to completion and is a homogeneous, free-flowing liquid having a consistency about as viscous as water, and coloring the reaction product with an inert coloring substance.

12. A method for preparing an ink characterized by reacting an aqueous alkaline solution of casein with formaldehyde in the absence of fixed electrolytes while agitating the same until the reaction passes from a curdy mass to a thin, free-flowing liquid having a consistency about as viscous as water and adding a coloring substance thereto.

MATTHEW S. HOPKINS.